United States Patent [19]

Kaufman et al.

[11] 4,285,305
[45] Aug. 25, 1981

[54] KEYED ADAPTER SLEEVE

[75] Inventors: Vernon R. Kaufman; Eugene L. Nelson, both of Cedarburg, Wis.

[73] Assignee: Tecumseh Products Company, Tecumseh, Mich.

[21] Appl. No.: 94,776

[22] Filed: Nov. 16, 1979

[51] Int. Cl.³ .............................................. F02P 3/06
[52] U.S. Cl. .............................. 123/146.5 A; 403/356; 74/440
[58] Field of Search .......... 123/149 A, 149 R, 149 L, 123/110 R, 148 E, 41 E, 146.5 A; 74/440; 403/338, 373, 300, 354, 362, 378, 356; 310/79, 261, 152, 70 R; 64/6, 9 R, 25, 2

[56] References Cited

U.S. PATENT DOCUMENTS

| | | | |
|---|---|---|---|
| 817,672 | 4/1906 | Sansom | 403/356 |
| 1,407,568 | 2/1922 | Page | 403/356 |
| 1,816,552 | 7/1931 | Trusler | 74/440 |
| 3,002,773 | 10/1961 | Hallgren | 403/356 |
| 3,187,213 | 6/1965 | Seidl et al. | 403/356 |
| 3,501,973 | 3/1970 | Casale | 403/356 |
| 3,554,179 | 1/1971 | Burson | 123/146.5 A |
| 3,830,577 | 8/1974 | Rampe et al. | 403/356 |
| 3,862,808 | 1/1975 | Perini | 403/356 |

*Primary Examiner*—Charles J. Myhre
*Assistant Examiner*—R. A. Nelli

*Attorney, Agent, or Firm*—Albert L. Jeffers; Roger M. Rickert

[57] ABSTRACT

An ignition timing method and apparatus is disclosed for presetting the ignition timing of an internal combustion engine having an engine driven shaft and a wheel supported on that shaft carrying a portion of the ignition system with another portion of that ignition system supported by the engine in a relatively fixed position adjacent the wheel. A slot is provided in the shaft surface extending generally in the direction of the axis of rotation of the shaft and a further slot is provided along an inner hub of the wheel. A selected one of several different keys including spacer keys of a generally frustoconical configuration having an outer protuberance for engaging a keyway in the wheel hub and an inner protuberance for engaging a keyway in the shaft is selected and positioned intermediate the shaft and hub to fix the relative angular orientation between the shaft and hub with those keys of the frustoconical sleeve configuration compensating for the dissimilarity in the size between the hub and shaft. The spacing between the inner and outer protuberances on the frustoconical sleeve determines a selected one of the different possible angular orientations while a non-spacing key having a selected offset determines the particular angular orientation between the wheel hub and a mating shaft.

21 Claims, 6 Drawing Figures

KEYED ADAPTER SLEEVE

BACKGROUND OF THE INVENTION

The present invention relates generally to the presetting of ignition timing for internal combustion engines and more particularly to an ignition timing method and apparatus adaptable to a number of different ignition systems on a number of different engines requiring a minimum number of relatively economical components peculiar to the particular engine-ignition combination. Even more particularly the present invention relates to a keyed adaptor sleeve which allows the use of a standard flywheel on a variety of different engines, many of which may be provided with different optimal ignition systems requiring different ignition timing.

An internal combustion engine manufacturer typically offers a wide variety of engine designs and options. For example, both two stroke cycle and four stroke cycle engines may be offered, and engines of varying crankshaft sizes may be available. Numerous ignition options may be available with each of the engine designs including, for example, solid state capacitor discharge ignition arrangements as well as magneto or breaker point ignition or other conventional ignition configurations. Further, a given ignition arrangement may be obsoleted by an improved later developed ignition arrangement and each ignition arrangement may require different preset timing for optimum engine operation.

In copending application Ser. No. 923,997, assigned to the assignee of the present application, there is disclosed an ignition timing scheme for adapting the same flywheel and ignition configuration to, for example, either a solid state capacitor discharge ignition arrangement or a magneto ignition arrangement by the appropriate selection of a particular offset key joining the flywheel to the engine crankshaft with that key having an offset appropriate to the particular ignition system employed. While this arrangement eliminates the necessity for stockpiling two different flywheels as spare parts for the same engine design, different flywheels are required for different engine configurations, for example, for engines having different size crankshafts. Further, the physical location of the fixed part of the ignition system on the engine may vary widely from design to design while the timing variations available from the offset key arrangement in this prior application are limited to something less than the sum of the widths of the two keyways to be occupied by the offset key. It would be highly desirable to extend the ideas of the aforementioned copending application, the entire disclosure of which is specifically incorporated by reference herein, to a wider variety of engine designs.

SUMMARY OF THE INVENTION

Among the several objects of the present invention may be noted the provision of a keyed adaptor sleeve for joining a larger size tapered hub and a smaller size tapered shaft at a preferred relative angle; the provision of a single flywheel design and a system for adapting that flywheel to a variety of engine crankshaft sizes and to a variety of preferred engine timing relative angular positions of the flywheel on any one of the crankshafts; the provision of an adaptor key which extends the utility and furthers the objects of the aforementioned copending application; the provision of an arrangement for adapting a standardized wheel and included portion of an ignition system to any of a number of different ignition systems and their associated different timing requirements on any of a number of different internal combustion engines including at least two different size engine driven shafts having tapered surface portions for rotatably supporting the standardized wheel, a hub portion of which is matable with the larger of the two shaft tapered surface portions; the provision of an adaptor sleeve for accommodating a standard flywheel to a number of different sized shafts at a number of different angular orientations relative to each shaft and used only in conjunction with shafts smaller than the largest shaft to which the flywheel may be mounted; and the provision of a method of presetting the ignition timing of an internal combustion engine. These as well as other objects and advantageous features of the present invention will be in part apparent and in part pointed out hereinafter.

In general, a method of presetting the ignition timing of an internal combustion engine includes providing a slot in the surface of a shaft which rotates with the engine and providing a slot in an inner hub portion of a wheel which supports one part of an ignition system. One of a plurality of spacer keys having differing offset amounts is selected and the wheel assembled to the shaft with the selected spacer key intermediate the wheel and shaft for forming a generally uniform separation therebetween and with one part of the selected spacer key occupying the shaft slot and another part of the selected spacer key occupying the wheel slot to thereby fix the angular relationship between the shaft and wheel at the angular offset determined by the particular spacer key selected.

Also in general and in one form of the invention, an adaptor sleeve is of a generally frustoconical configuration having an outer protuberance for engaging a keyway in a flywheel and an inner protuberance for engaging a keyway in a shaft with the spacing between the inner and outer protuberances determining a selected one of different angular orientations between the flywheel and shaft. The sleeve has a generally uniform side wall thickness which determines the spacing between the flywheel and a selected smaller shaft.

Still further in general and in one form of the invention, an arrangement for coupling an engine driven shaft and a shaft supported wheel at a selectable relative angular orientation to determine engine ignition timing includes a wheel hub which is integral with the wheel having a tapered central opening and a keyway in the tapered central opening along with a keyway in the shaft tapered surface and a key which is effective only when the hub and shaft are joined with their respective tapers in spaced alignment to join the hub keyway and shaft keyway, locking the wheel to the shaft in a selected one of a plurality of relative angular positions.

BRIEF DESCRIPTION OF THE DRAWING

Corresponding reference characters indicate corresponding parts throughout the several views of the drawing.

The exemplifications set out herein illustrate a preferred embodiment of the invention in one form thereof and such exemplifications are not to be construed as limiting the scope of the disclosure or the scope of the invention in any manner.

DESCRIPTION OF THE PREFERRED EMBODIMENT

Figure 5:
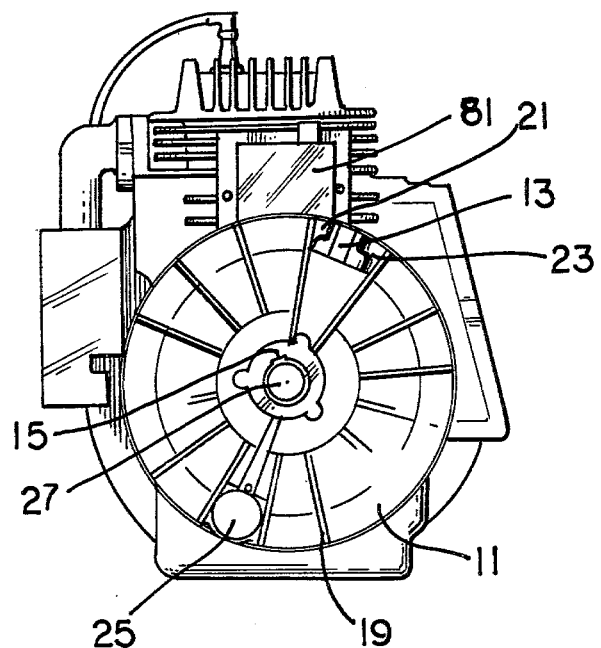
FIG. 5 is a side elevation view of an internal combustion engine with the flywheel of FIG. 3 supported on a larger size shaft than illustrated in FIG. 3.

Referring now to the drawing generally, an arrangement for adapting a standardized wheel such as the flywheel 11 which includes a portion of an ignition system such as permanent magnet 13 to any of a number of different ignition systems, such as a solid state capacitor discharge ignition system and a breaker point magneto type ignition system, both of which employ the permanent magnet 13 as a part thereof but each of which has somewhat different timing requirements on any of a number of different internal combustion engines including at least two different size engine driven shafts, employs the offset key 15 of FIG. 5 in conjunction with the largest engine driven shaft while employing the adaptor or spacer key 17 of FIGS. 1 through 4 in conjunction with smaller shaft sizes.

Wheel 11, which may be an engine flywheel, may be die cast of a non-magnetic metal including air circulating blades 19, as well as starter gear teeth on the side of the wheel toward the engine. Permanent magnet 13 and a pair of pole shoes 21 and 23, as well as counterbalancing weight 25, are permanently affixed to the flywheel, with this same flywheel being designed for use in conjunction with either of the above-mentioned ignition systems on engines having larger crankshafts 27, as well as smaller engine crankshafts 29. The cooperating stationary portion of the ignition system is illustrated at 81, however, it should be noted that the positioning of this portion of the ignition system may vary widely from engine to engine, and since the position of magnet 13 relative to the wheel keyway 31 is fixed, as is the position of shaft keyway 33 on crankshaft 29, a very substantial offset between these two keyways is sometimes required.

Figure 1:
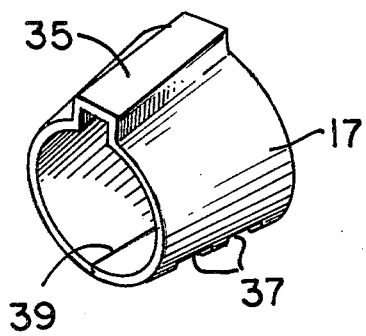
FIG. 1 is a perspective view of a keyed adaptor sleeve according to the present invention.

Referring now to FIG. 1, the adaptor sleeve 17 is to be used to accommodate the standardized flywheel 11 to a number of different size tapered shafts 27 or 29 at a number of different angular orientations relative to each shaft, as determined by the angular separation between outwardly projecting key portion 35 and inwardly projecting key portion 37. Adaptor sleeve 17 is used in conjunction with shafts smaller than the largest shaft, such as 27, to which the flywheel is to be mounted, and is of a generally frustoconical configuration with the outer protuberance 35 for engaging the keyway 31 in the flywheel and the inner protuberances, such as 37, for engaging keyway 33 in the shaft. The adaptor sleeve has a generally uniform side wall thickness which determines the spacing between the inner hub of the flywheel and the outer surface of a selected smaller shaft. The sleeve is desirably formed as a stamping from sheet metal stock of a relatively uniform thickness with this thickness determining the spacing between the flywheel and selected smaller shafts. The ends of the stamping are merely butted together as along the line 39.

Shaft 27 includes a tapered surface portion which mates with a correspondingly tapered opening in the hub 41 of wheel 11. Smaller shafts, such as 29, have a correspondingly tapered surface portion 43 and the adaptor sleeve is provided with the appropriate taper so that its exterior surface mates with the tapered central opening in hub 41 while its interior surface mates with the tapered surface portion 43 of shaft 29.

Figure 6:
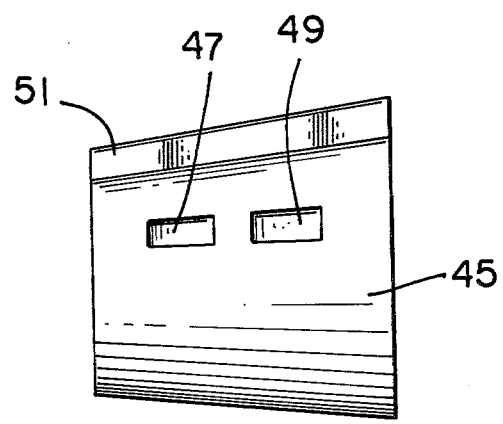
FIG. 6 illustrates a spacer key similar to FIG. 2 but differing in the amount of offset.

While FIGS. 1 through 4 illustrate spacer key 17 having an angular separation between the outer protuberance or wheel hub key portion 35 and the inner protuberance or shaft key portion 37 of about 135 degrees, FIGS. 6 illustrates a similar spacer or adaptor key 45 having indentations 47 and 49 forming the shaft key portions which are displaced from the outer protuberance or wheel hub key portion 51 by only about 60°. Generally, different ignition systems on otherwise identical engines do not require such a large disparity and correspondingly large difference in the relative angular orientation between the wheel and shaft.

Figure 2:
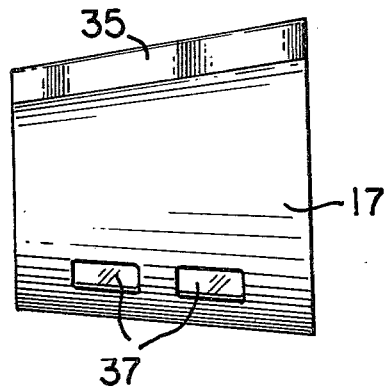
FIG. 2 is a side view of the sleeve of FIG. 1.

It will be noted in FIGS. 1, 2 and 6 that the outer protuberance extends generally along one slant height of the frustoconical configuration while the shaft engaging inner protuberance extends along another slant height of the frustoconical configuration. The corresponding slots in the shaft surface and the inner hub of the wheel may be of a generally uniform depth and extend generally in the direction of the axis of rotation of the shaft.

Figure 3:
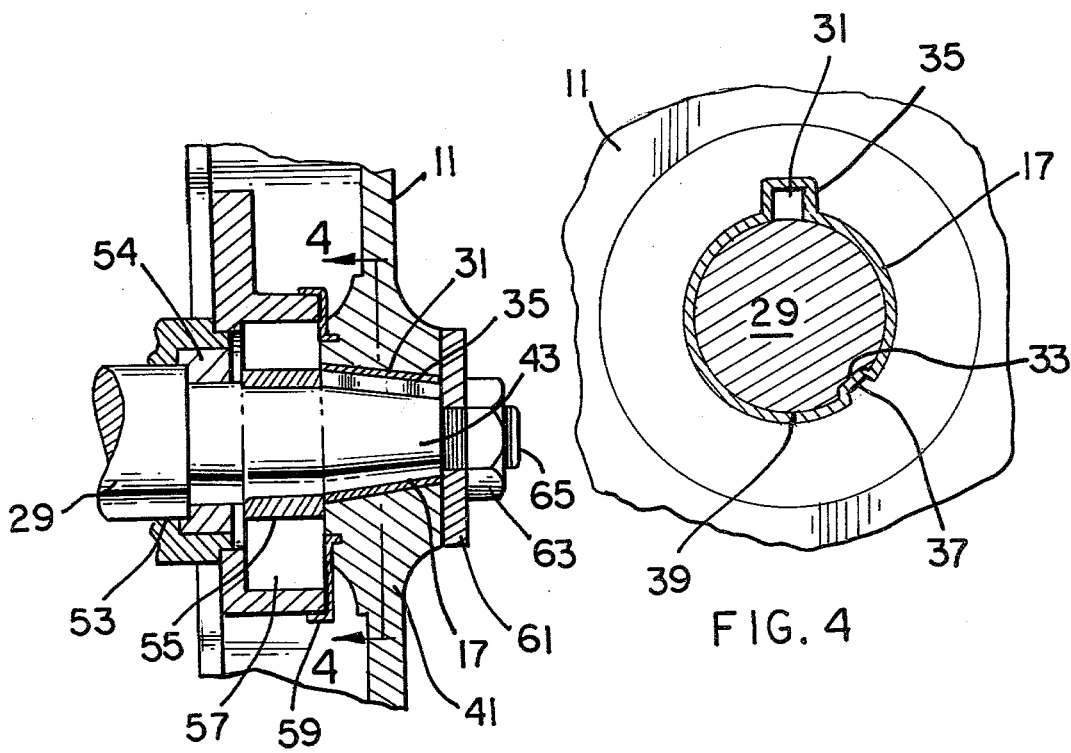
FIG. 3 is a view in cross-section of an engine driven shaft and flywheel interconnected employing the sleeve of FIGS. 1 and 2.
Figure 4:
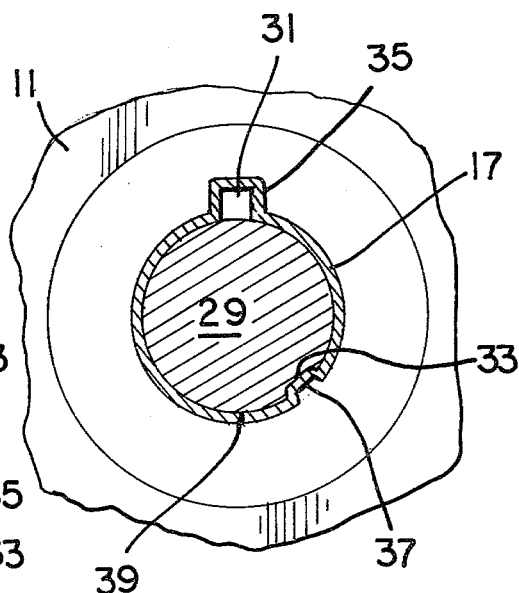
FIG. 4 is a view along section lines 4—4 of FIG. 3.

In FIG. 3, the flywheel 11 and smaller tapered shaft 29 are illustrated in their spaced assembled positions on a portion of an engine and with the spacer key 17 of FIGS. 1 and 2 interlocking the wheel and shaft as well as providing the uniform spacing therebetween. In FIG. 3, crankshaft 29 is journaled in suitable bearings such as at 53 with a crankshaft sleeve 54 and has a cam sleeve 55 for actuating contacts positioned within the region 57 when a contact type ignition system is employed. A suitable annular dust cover 59 may be provided to minimize the accumulation of dirt or moisture within the contact point region 57. Flywheel 11 is assembled to the shaft tapered portion 43 by moving the larger open end of the wheel hub 41 opening toward the smaller outer end of the tapered portion 43 with the selected spacer key firmly engaging both the shaft and the inner hub and determining their relative angular orientation by the mating of the keyways and respective portions of sleeve 17. In this assembled position, the wheel hub and shaft tapered portion are spaced from one another by a uniform amount corresponding to the side wall thickness of the sleeve 17. Washer 61 and nut 63 are then assembled over the threaded end 65 of the crankshaft to complete the asembling of the wheel to the shaft at a preset ignition timing according to the particular angular offset associated with the selected spacer key.

From the foregoing, it is now apparent that a novel engine timing method as well as a novel keyed adaptor sleeve for presetting the ignition timing of an internal combustion engine employing one flywheel adaptable to a variety of engines and allowing the stockpiling of relatively inexpensive and easy to handle keying arrangements peculiar to individual engine designs has been disclosed meeting the objects and advantageous features set out hereinbefore as well as others and that modifications as to the precise configurations, shapes and details, as well as the precise steps of the method, mahy be made by those having ordinary skill in the art without departing from the spirit of the invention or the scope thereof as set out by the claims which follow.

What is claimed is:

1. An arrangement for adapting a standardized wheel and included portion of an ignition system to any of a number of different ignition systems and their associated different timing requirements on any of a number of different internal combustion engines including at least two different size engine driven shafts having tapered surface portions for rotatably supporting the standardized wheel wherein the standardized wheel has a wheel hub integral therewith having a tapered central opening matable with a larger of the two shaft tapered surface portions, and the shaft tapered surfaces and the wheel hub tapered central opening each contain a keyway, comprising a generally frustoconical sleeve having an outer surface matable with the wheel hub central opening and an inner surface matable with a smaller of the two shaft tapered surface portions and having an outer protuberance for engaging the wheel hub keyway and an inner protuberance for engaging the shaft keyway with the spacing between the inner and outer protuberances selected to provide a desired engine ignition timing setting.

2. The arrangement of claim 1 wherein the outer protuberance extends generally uniformly along a slant height of the sleeve.

3. The arrangement of claim 1 wherein the sleeve has a generally uniform side wall thickness for determining the spacing between the wheel hub and the shaft tapered surface.

4. The arrangement of claim 1 wherein the outer protuberance extends generally uniformly along a slant height of the sleeve and the inner protuberance comprises a pair of radially inward side wall depressions spaced along a slant height distinct from the outer protuberance.

5. The arrangement of claim 1 wherein the shaft keyway and the wheel hub keyway are each of a generally uniform depth relative to their respective tapered surface.

6. The arrangement of claim 1 wherein when a standardized wheel is mounted on an engine having a smaller shaft tapered surface portion and equipped with a magneto type ignition system, a sleeve having a first spacing between the inner and outer protuberances is positioned between the shaft tapered surface and the wheel hub tapered central opening, while, when a standardized wheel is mounted on an engine having a smaller shaft tapered surface portion and equipped with a capacitor discharge solid state type ignition system, a sleeve having a second spacing between the inner and outer protuberances different from said first spacing is positioned between the shaft tapered surface and the wheel hub tapered central opening, and when a standardized wheel is mounted on an engine having a larger shaft tapered surface portion, the wheel hub tapered central opening and shaft tapered surface are in direct contact.

7. The arrangement of claim 6 wherein the ignition system portion included as a part of the standardized wheel comprises a permanent magnet as an essential component of any one of said ignition system types.

8. The arrangement of claim 7 wherein the standardized wheel is constructed primarily of a non-magnetic material with the permanent magnet fastened to the wheel near the outer periphery thereof.

9. An adapter sleeve for accommodating a standardized flywheel to a number of different size shafts at a number of different angular orientations relative to each shaft and used only in conjunction with shafts smaller than the largest shaft to which the flywheel may be mounted comprising a generally frustoconical sleeve having an outer protuberance for engaging a keyway in the flywheel and an inner protuberance for engaging a keyway in a shaft, the spacing between the inner and outer protuberances determining a selected one of the different angular orientations.

10. The adapter sleeve of claim 9 wherein the sleeve has a generally uniform side wall thickness for determining the spacing between the flywheel and a selected smaller shaft.

11. The adapter of claim 9 wherein the outer protuberance extends generally uniformly along a slant height of the sleeve and the inner protuberance comprises a pair of radially inward side wall depressions spaced along a slant height distinct from the outer protuberance.

12. The adapter of claim 11 wherein the sleeve is formed as a stamping from sheet metal stock of relatively uniform thickness which thickness determines the spacing between the flywheel and a selected smaller shaft.

13. In an internal combustion engine having an engine driven shaft with a tapered surface portion, and a shaft supported wheel for rotatably supporting a portion of the engine ignition system, an improved arrangement for coupling the shaft and wheel at a selectable relative angular orientation to determine the engine ignition timing comprising:

a wheel hub integral with the wheel and having a tapered central opening;

at least one keyway in the shaft tapered surface;

at least one keyway in the wheel hub tapered central opening; and key means effective only when the hub and shaft are joined with their respective tapers in spaced alignment to join a hub keyway and a shaft keyway locking the wheel to the shaft in any selected one of a plurality of relative angular positions;

the shaft tapered surface and the wheel hub tapered opening each including but a single keyway, the key means comprising a plurality of differing keys any one of which may join the hub keyway and the shaft keyway and each of which provides a different relative angular orientation between the wheel and the shaft with each key comprising a generally frusto-conical sleeve having an outer protuberance for engaging the wheel hub keyway and an inner protuberance for engaging the shaft keyway.

14. The arrangement of claim 13 wherein differing keys have varying spacing between the inner and outer protuberance.

15. The arrangement of claim 13 wherein the outer protuberance extends generally uniformly along a slant height of the sleeve.

16. In an internal combustion engine having an engine driven shaft with a tapered surface portion, and a shaft supported wheel for rotatably supporting a portion of the engine ignition system, an improved arrangement for coupling the shaft and wheel at a selectable relative angular orientation to determine the engine ignition timing comprising:

a wheel hub integral with the wheel and having a tapered central opening;

at least one keyway in the shaft tapered surface;

at least one keyway in the wheel hub tapered central opening; and key means effective only when the hub and shaft are joined with their respective tapers in spaced alignment to join a hub keyway and a shaft keyway locking the wheel to the shaft in any selected one of a plurality of relative angular positions;

the key means comprising a generally frusto-conical sleeve having an outer protuberance for engaging the wheel hub keyway and an inner protuberance for engaging the shaft keyway, the spacing between the inner and outer protuberances determining the particular selected one of the plurality of relative angular positions.

17. The arrangement of claim 16 wherein the sleeve has a generally uniform side wall thickness for determining the spacing between the wheel hub and the shaft tapered surface.

18. The arrangement of claim 17 wherein the outer protuberance extends generally uniformly along a slant height of the sleeve and the inner protuberance comprises a pair of radially inward side wall depressions spaced along a slant height distinct from the outer protuberance.

19. In an internal combustion engine having an engine driven shaft with a tapered surface portion, and a shaft supported wheel for rotatably supporting a portion of the engine ignition system, an improved arrangement for coupling the shaft and wheel at a selectable relative angular orientation to determine the engine ignition timing comprising:

a wheel hub integral with the wheel and having a tapered central opening;

at least one keyway in the shaft tapered surface;

at least one keyway in the wheel hub tapered central opening, the shaft keyway and the wheel hub keyway each being of a generally uniform depth relative to their respective tapered surface; and key means effective only when the hub and shaft are joined with their respective tapers in spaced alignment to join a hub keyway and a shaft keyway locking the wheel to the shaft in any selected one of a plurality of relative angular positions.

20. The method of presetting the ignition timing of an internal combustion engine having a rotatable shaft and a wheel supported on the shaft for rotation therewith wherein the wheel is a standardized flywheel designed to fit a number of different engines including engines of at least two different sizes of rotatable shafts the largest of which fits the flywheel inner hub and wherein the engine ignition system includes a relatively fixed portion supported by the engine and a movable portion supported on the wheel for rotation therewith, the method comprising the steps of:

providing a slot in the shaft surface extending generally in the direction of the axis of rotation of the shaft;

providing a slot in the wheel along an inner hub thereof;

selecting one of a plurality of spacer keys having differing offset amounts, the step of selecting including choosing a spacer key of the appropriate offset amount having a dimension to provide a uniform separation just sufficient to compensate for the difference in size between the largest size shaft and the particular shaft to which the wheel is to be assembled;

assembling the wheel to the shaft with the selected spacer key intermediate the wheel and shaft forming a generally uniform separation therebetween by moving the larger open end of the wheel inner hub toward the smaller outer end of a tapered portion of the shaft until the selected spacer key firmly engages both the shaft and the inner hub, and with one part of the selected spacer key occupying the shaft slot and another part of the selected spacer key occupying the wheel slot to thereby fix the angular relationship between the shaft and wheel at the angular offset determined by the particular spacer key selected.

21. The method of claim 20 wherein each of the plurality of spacer keys is a sleeve of a generally frustoconical configuration having a relatively uniform side wall thickness which is the uniform separation providing dimension.

* * * * *